US011132199B1

(12) United States Patent
Tran

(10) Patent No.: US 11,132,199 B1
(45) Date of Patent: Sep. 28, 2021

(54) PROCESSOR HAVING LATENCY SHIFTER AND CONTROLLING METHOD USING THE SAME

(71) Applicant: ANDES TECHNOLOGY CORPORATION, Hsinchu (TW)

(72) Inventor: Thang Minh Tran, Saratoga, CA (US)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/836,864

(22) Filed: Mar. 31, 2020

(51) Int. Cl.
*G06F 9/30* (2018.01)
(52) U.S. Cl.
CPC ........ *G06F 9/30145* (2013.01); *G06F 9/3013* (2013.01); *G06F 9/30181* (2013.01)
(58) Field of Classification Search
None
See application file for complete search history.

(56) References Cited

U.S. PATENT DOCUMENTS

| | | | | |
|---|---|---|---|---|
| 5,222,240 A * | 6/1993 | Patel | .................... | G06F 9/30141 712/218 |
| 5,826,055 A * | 10/1998 | Wang | .................... | G06F 9/3857 712/218 |
| 6,240,508 B1 * | 5/2001 | Brown, III | .............. | G06F 9/383 710/39 |
| 7,418,551 B2 * | 8/2008 | DeVale | .................. | G06F 9/3859 711/118 |
| 7,478,225 B1 * | 1/2009 | Brooks | .................. | G06F 9/3836 712/214 |
| 7,506,140 B2 * | 3/2009 | Jensen | .................. | G06F 7/5055 712/218 |
| 8,782,378 B2 * | 7/2014 | Chaussade | .......... | G06F 9/30072 712/220 |
| 9,286,069 B2 * | 3/2016 | Airaud | ................ | G06F 9/30141 |

FOREIGN PATENT DOCUMENTS

EP          1039369 A1 * 9/2000    ............... G06F 5/06

* cited by examiner

*Primary Examiner* — Eric Coleman
(74) *Attorney, Agent, or Firm* — JCIPRNET

(57) ABSTRACT

A processor that includes a register file, a latency shifter, a decode unit and a plurality of functional units is introduced. The register file includes a write port. The latency shifter includes a plurality of shifter entries and shifts out a shifter entry among the shifter entries every clock cycle. Each of the shifter entries is associated with a clock cycle and each of shifter entries includes a writeback value that indicates whether the write port of the register file is available for a writeback operation in the associated clock cycles. The decode unit is configured to decode an instruction and issue the instruction according to the writeback value of the latency shifter. The functional units are coupled to the decode unit and the register file and are configured to execute the instruction issued by the decode unit and perform writeback operation to the write port of the register file.

27 Claims, 11 Drawing Sheets

PROCESSOR HAVING LATENCY SHIFTER AND CONTROLLING METHOD USING THE SAME

BACKGROUND

Technical Field

The disclosure generally relates to a processor architecture, and more specifically, to a processor including a latency shifter and a method for controlling an instruction pipeline of the processor.

Description of Related Art

One of approaches for improving performance of a processor is using an instruction pipeline to execute instructions. The execution of an instruction in the instruction pipeline is decomposed to several stages that include a writeback stage. In the writeback stage, a writeback operation is performed to write result data to a register file through a write port of the register file. Since the number of the write port in the register file is limited, conflict may occur when several instructions need more write ports to write back to the register file than the number of available write ports in a same clock cycle. The conflict of using the write port results in stalling or interlocking of the instructions in the instruction pipeline, thereby reducing the performance of the processor. Furthermore, write back stage is often the last stage of pipeline execution, stalling of the instruction due to write back conflict have a massive ripple effect to all execution pipeline stages. In addition, the instruction pipeline has a very complicated control logic that requires information from several places and components of the processor.

As demand for improving performance of the processor, there has grown a need for a processor and a controlling method that may efficiently prevent stalling and interlocking of the instructions.

SUMMARY

In one of the embodiments of the disclosure, a microprocessor includes a register file, a latency shifter, a decode unit, and functional units. The register includes a write port. The latency shifter includes a plurality of shifter entries and configured to shift out a shifter entry among the plurality of shifter entries every clock cycle, wherein each of the plurality of shifter entries is associated with a clock cycle and each of the plurality of shifter entries comprises a writeback value that indicates an availability of the write port of the register file for a writeback operation in the clock cycle. The decode unit, coupled to the latency shifter, configured to decode an instruction and issue the instruction based on the writeback values included in the plurality of shifter entries of the latency shifter. In addition, the functional units is to the decode unit and the register file and configured to execute the instruction issued by the decode unit and perform the writeback operation to the write port of the register file.

In one of the embodiments, a method of scheduling a write port of a register file of a microprocessor, includes at least the following steps. A first clock cycle is determined based on an execution latency time of an instruction to be issued. An availability of a write port in the first clock cycle is determined based on a writeback value of a latency shifter, wherein the writeback value is included in a shifter entry among a plurality of shifter entries of the shifter latency, and the plurality of shifter entries is shifted out every clock cycle. The instruction is decoded and issued when the writeback value of the latency shifter indicates that the write port is available in the first clock cycle. The instruction is stalled when the writeback value of the latency shifter indicates that the write port is not available in the first clock cycle.

BRIEF DESCRIPTION OF THE DRAWINGS

Aspects of the present disclosure are best understood from the following detailed description when read with the accompanying figures. It is noted that, in accordance with the standard practice in the industry various features are not drawn to scale. In fact, the dimensions of the various features ay be arbitrarily increased or reduced for clarity of discussion.

DESCRIPTION OF THE EMBODIMENTS

Figure 1:
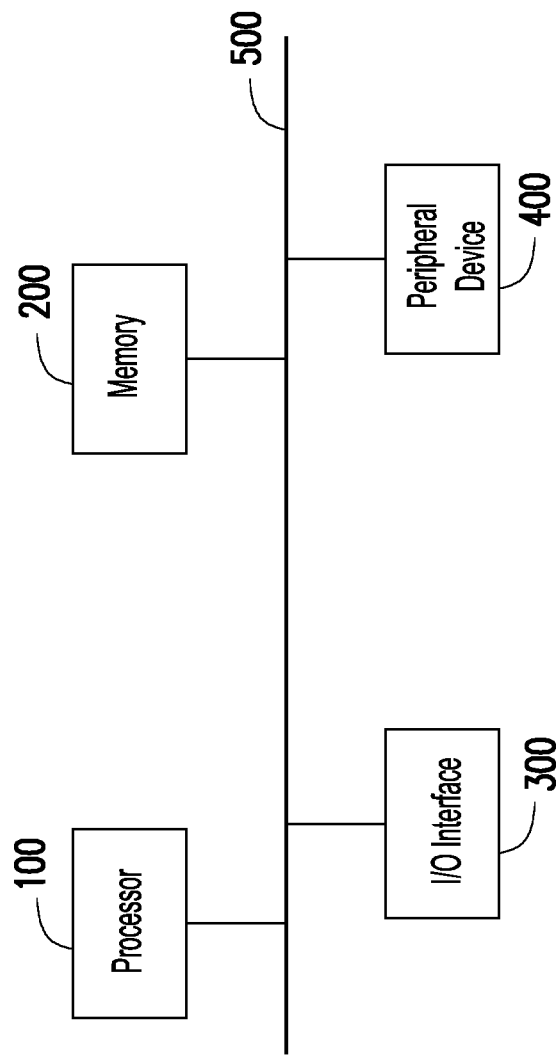
FIG. 1 is a block diagram illustrating a computer processing system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or a second feature in the description that to follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition s for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a computer processing system 10 that includes a processor 100, a memory 200, an input/output (I/O) interface 300, a peripheral device 400, and a bus 500 in accordance with some embodiments. The bus 500 may allow bi-direction communications among the components of the computer processing system 10. Some embodiments of the disclosure may use more, less, or different components than those illustrated in FIG. 1. As an example, the computer processing system 10 may further include a timer, a serial peripheral interface, a digital-to-analog converter, an analog-to digital converter, a display driver, a plurality of types of memory, and any other suitable components.

In some embodiments, the processor 100 is configured to execute instructions using an instruction pipeline, in which the execution of the instruction is decomposed to several stages such as an instruction fetch stage, an instruction decode stage, an instruction execution stage and a writeback stage. The processor 100 may include caches such as a data cache and an instruction cache that have relatively high access rates. The data cache for the processor 100 may be multi-level data cache that may include a L1 data cache, a L2 data cache, and a L3 data cache. The L1 data cache, L2 data cache and the L3 data cache may be located inside or outside the processor 100. In some embodiments, the computer processing system 10 includes a plurality of processors, and any number of the processors may be the same or may be different from the processor 100.

The memory 200 is configured to store program codes of instructions and data that are needed for the execution of the instructions. The memory 200 may include non-volatile memory or volatile memory or a combination thereof. For example, the memory 200 may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The I/O interface 300 is configured to couple input devices and output devices to the computer systems 10 through the bus 500. The computer system 10 may receive data from the input devices and send data to the output devices through the I/O interface 300. The I/O interface 300 may include at least one of a serial connection interface and a parallel connection interface in wired or wireless connections. The peripheral device 400 may include a keyboard, a mouse, a sensor, a signal receiver, a monitor and any other suitable devices.

Figure 2:
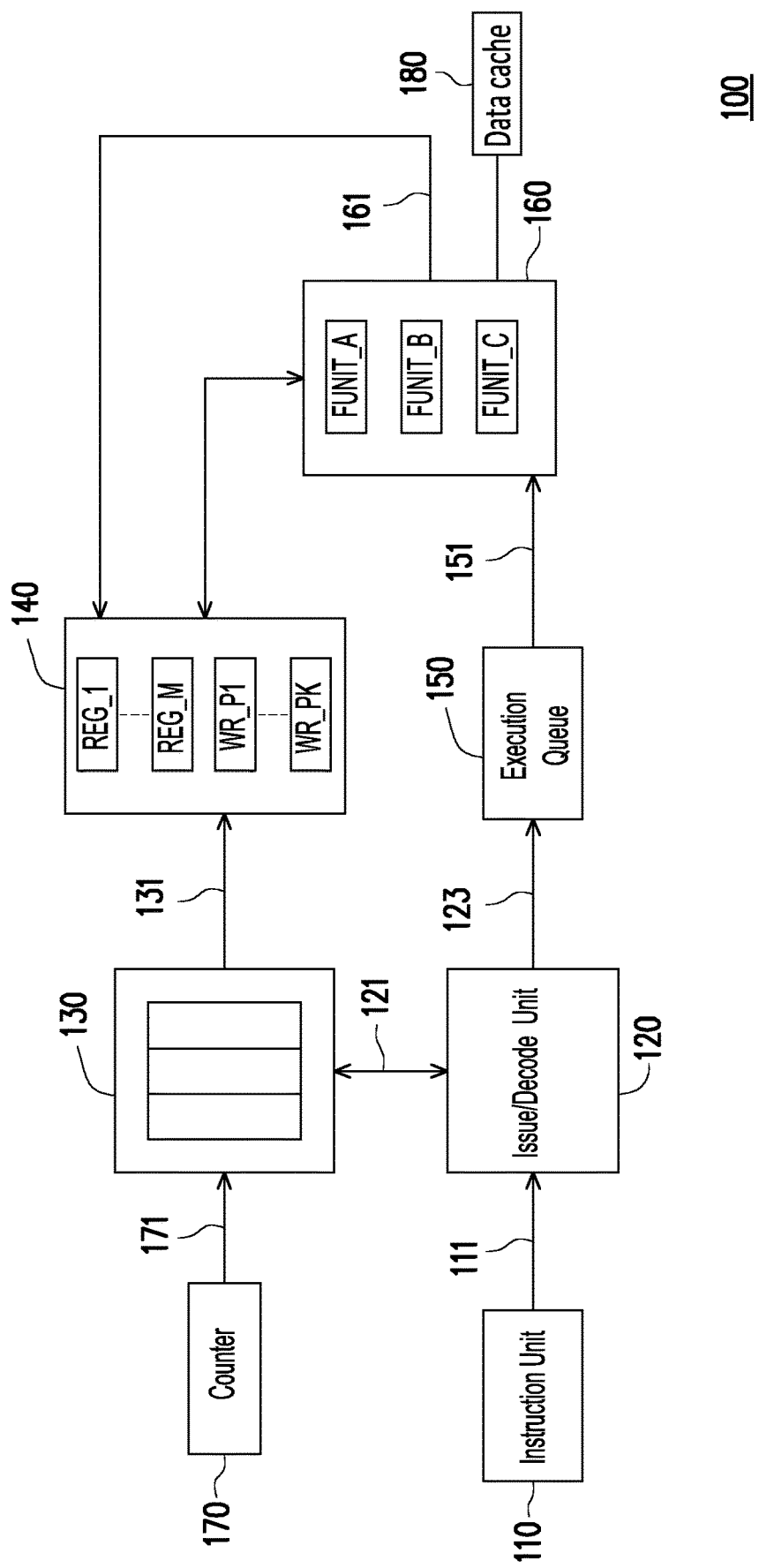
FIG. 2 is a block diagram illustrating a processor in accordance with some embodiments.

FIG. 2 illustrates a block diagram of the processor 100 in accordance with some embodiments. The processor 100 may include an instruction unit 110, an issue/decode unit 120, a latency shifter 130, a register file 140, an execution queue 150 and a function unit module 160. The instruction unit 110 is configured to provide an instruction I11 for execution by the processor 100. The instruction I11 may be a scalar instruction or a vector instruction depending on the architecture of the processor 100. In some embodiments, the instruction I11 may be a general instruction, a long-latency instruction or an unknown latency instruction. The general instruction may refer to the instruction having the known execution latency time and the known execution latency time is shorter than a threshold value. The long-latency instruction may refer to the instruction having the known execution latency time and the known execution latency time is greater than a threshold value. For example, the long-latency instruction may be a floating-point divide instruction, a floating-point square-root instruction, a floating-point sum reduction instruction and an integer divide instruction. The unknown-latency instruction may refer to the instruction having unknown execution latency time such as a load instruction.

The register file 140 may include a plurality of registers REG_1 through REG_M that are configured to store data of the register file 140. The registers REG_1 through REG_M may store operands that are used for execution of the issued instruction, and/or the result data that are written to the register file 140 through the writeback operation of the issued instruction. The number of the registers REG_1 through REG_M may vary according to the architecture of the processor 100. In some embodiments, the register file 140 further includes at least one write port WR_P1 through WR_PK, in which the result data are written to the register file 140 through the at least one write port WR_P1 through WR_PK. In some embodiments, the register file 140 may further include at least one read port (not shown) for reading the data stored in the register file 140.

The latency shifter 130 may include a plurality of shifter entries that are shifted every clock cycle. Each shifter entry of the latency shifter 130 is associated with a clock cycle (e.g., $x^{th}$ clock cycle, where x is a positive integer), and each shifter entry includes a writeback value (e.g., wb_shift[x]) that indicates an availability of a write port of the register file 140 in the clock cycle. The writeback value wb_shift[x] may be a multi-bit value or a single-bit value that indicates either the logic value of "1" and the logic value of "0". For example, when the writeback value wb_shift[x] is the logic value of "1", it indicates that write port is not available for the writeback operation in the $x^{th}$ clock cycle. In other words, there is another writeback operation that is going to be performed to the write port in the $x^{th}$ clock cycle. Alternatively, when the writeback value wb_shift[x] is the logic value of "0", it indicates that the write port is available for the writeback operation in the $x^{th}$ clock cycle. In some embodiments, the writeback values of the latency shifter 130 are set upon the issuance of the instructions to be executed by the processor 100.

The issue/decode unit 120 is coupled to the instruction unit 110 and the latency shifter 130 and is configured to decode and issue the instruction I11 based on the writeback values stored in the shifter entries of the latency shifter 130. In some embodiments, when the instruction I11 is provided to the issue/decode unit 120, the issue/decode unit 120 may determine the execution latency time of the instruction I11. The execution latency time of the instruction I11 may be the number of the clock cycles needed for executing the instruction I11. In some embodiments, the instruction I11 with x clock cycles of execution latency time will have writeback operation in the $x^{th}$ clock cycle. In some embodiments, the issue/decode unit 120 is configured to determine whether to stall or issue the instruction I11 having the x clock cycles of execution latency time based on the writeback value wb_shift[x] of the latency shifter 130. When the writeback value wb_shift[x] is "0", the issue/decode unit 120 decodes and issues the instruction I11 to the execution queue 150. Upon the issuance of the instruction I11, the writeback value wb_shift[x] of the latency shifter 130 is set to "1". When the writeback value wb_shift[x] of the latency shifter 130 is "1", the issue/decode unit 120 stalls the issuance of the instruction I11, and checks the availability of the write port in the next clock cycle or $(x+1)^{th}$ clock cycle. The issue/decode unit 120 may communicate with the latency shifter 130 through a signal 121.

In some embodiments, the execution queue 150 is coupled to the issue/decode unit 120 and is configured to arrange the issued instructions in a queue. The execution queue 150 may provide the issued instruction I51 to the functional unit module 160 for execution.

The functional unit module 160 may include a plurality of functional units FUNIT_A, FUNIT_B and FUNIT_C that are configured to execute the issued instructions provided by the execution queue 150. In some embodiments, the functional unit module 160 may include an arithmetic logic unit (ALU), an address generation unit (AGU), a floating-point unit (FPU), a load-store unit (LSU), a branch execution unit (BEU), and other suitable functional units. In some embodiments, the instruction I51 to be executed by the functional units of the processor 100 may be associated with a set of operands that are stored in the register file 140. The functional units of the processor 100 may access the register file 140 through the available read ports of the register file 140 to obtain the set of operands for the execution of the instruction I51. The result data 161 outputted by the functional unit module 160 may be written to the register file 140 in the write back operations through available write port of the register file 140. In some embodiments, the result data 161 of the functional unit module 160 may be forwarded for other instructions in the instruction pipeline to improve performance of the processor 100.

In some embodiments, the processor 100 further includes a counter 170 and a data cache 180, in which the counter 170 may communicate with the latency shifter 130 through signals 171. The data cache 180 may communicate with a load/store function unit (not shown) of functional unit module 160. The counter 170 may have a counter value ex_cnt[x], and the counter 170 is configured to count down the counter value ex_cnt[x] every clock cycle until the counter value ex_cnt[x] reaches a threshold value. In some embodiments, the threshold value is determined according to the total number of the shifter entries in the latency shifter 130. In some embodiments, the counter 170 and the latency shifter 130 may be used to assist the issues/decode unit 120 to issue the long-latency instructions such as the floating-point instruction, the square-root instruction, the floating-point sum reduction instruction or the integer divide instruction.

The data cache 180 may include different cache levels such as a L1 data cache, a L2 data cache and a L3 data cache, in which the access rates of the L1 data cache, L2 data cache and L3 data cache are different. The access rate of the L1 data cache is faster than that of L2 data cache and the access rate of the L2 data cache is faster than that of L3 data cache. In some embodiments, all the L1 data cache, L2 data cache and L3 data cache are located inside the processor 100. In alternative embodiments, the L1 data cache is located inside the processor 100, and the L2 data cache and the L3 data cache are located outside the processor 100. In some embodiments, a request-accept protocol may be implemented between the data cache 180 and the latency shifter 130. In addition, the request-accept protocol may be also implemented between the external memory (e.g., memory 200 in FIG. 1) and the latency shifter 130. The request-accept protocol may be used to assist the issuance of the unknown latency instruction such as the load instruction. The execution latency time of the load instruction is unknown as a nature of the data cache hit/miss and data bank conflict. For example, the execution of the load instruction is much shorter when the data necessary for the execution of the load data is found in the L1 cache data instead of L2 cache data or L3 cache data. The execution latency time of the load instruction is long and unknown when the data is found in the external memory.

In some embodiments, the write ports WR_P1 through WR_PK of the register file 140 include a plurality of shared write ports and a dedicated write port, where the shared write ports are shared for all functional units and the dedicated write port is configured for the unknown latency instructions such as the load instruction. In some embodiments, the number of the latency shifter 130 in the processor is equal to the number of the shared write ports in the register file 140, and each of the write ports is associated with one of the latency shifters.

Figure 3A:
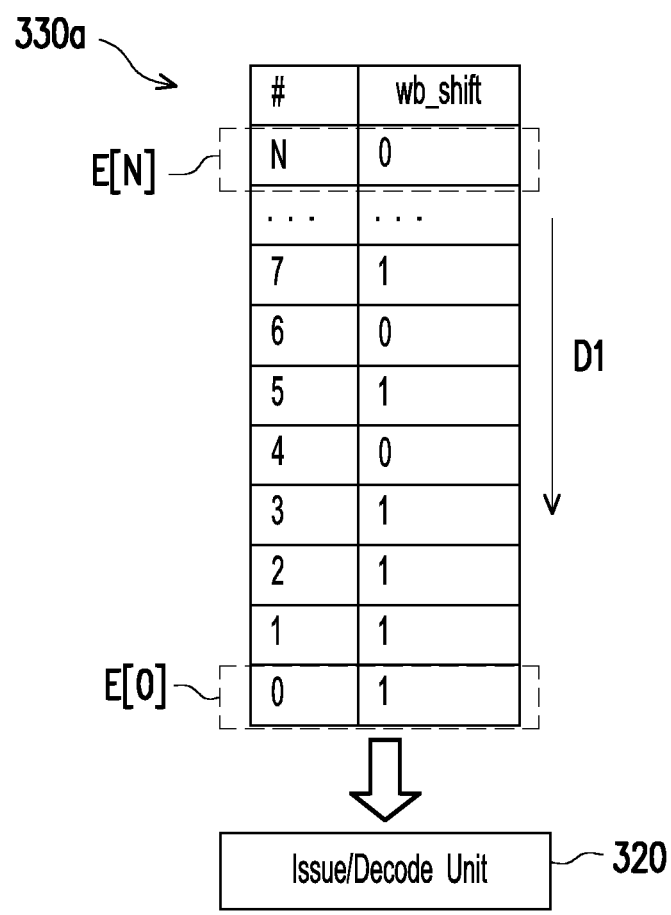
FIG. 3A through 3B illustrate latency shifters in accordance with some embodiments.

FIG. 3A illustrates a latency shifter 330a in accordance with some embodiments. The latency shifter 330a may include a plurality of shifter entries E[0] through E[N] that are configured to be shifted every clock cycle in a direction D1. The shifter entry E[0] is referred to as the bottom shifter entry (e.g., least significant bit, LSB) and the shifter entry E[N] is referred to as the top shifter entry (e.g., most significant bit, MSB). The latency shifter 330a may shift out the bottom shifter entry E[0] every clock cycle. In some embodiments, the shifter entry E[x] of the latency shifter 330a includes a writeback value wb_shift[x] that indicates the availability of the write port of the register file 140 in the $x^{th}$ clock cycle. When writeback value wb_shift[x] is the first predetermined value (e.g., "1"), it indicates that the write port is not available in the $x^{th}$ clock cycle. When writeback value wb_shift[x] is the second predetermined value (e.g., "0"), it indicates that the write port is available in the $x^{th}$ clock cycle. For example, the writeback value wb_shift[0] of the shifter entry E[0] is "0" that indicates that the write port of the register file 140 is available in the next clock cycle. The writeback value wb_shift[5] is "1" that indicates that the write port of the register file 140 is not available in the fifth clock cycle.

In some embodiments, the issue/decode unit 320 may control the issuance of an instruction based on the writeback values wb_shift[0] through wb_shift[N] stored in the shifter entries E[0] through E[N] of the latency shifter 330a. For example, when the issue/decode unit 320 receives the instruction having the execution latency time of x clock cycles, the issue/decode unit 320 may check whether the writeback value wb_shift[x] is "1" or "0". If the writeback value wb_shift[x] is "0", the issue/decode unit 320 may issue the instruction and the writeback operation of the instruction is performed in the $x^{th}$ clock cycle. Once the instruction is issued, the writeback value wb_shift[x] of the latency shifter 330a is set to "1" for preventing conflict of using the write port in the $x^{th}$ clock cycle. If the writeback value wb_shift[x] is "1", the issue/decode unit 320 stalls the instruction, and checks the availability of the write port in the next clock cycle for $(x+1)^{th}$ clock cycle. The issue/decode unit 320 may check the availability of the write port through the writeback values of the latency shifter 330a in the subsequent clock cycles until the available shifter entry is found. In this way, the availability of the write port is checked by simply checking the writeback values, wb_shift[x], stored in the latency shifter 330a. As such, the control of the instruction pipeline is simplified with the usage of the latency shifter 330a.

Figure 3B:
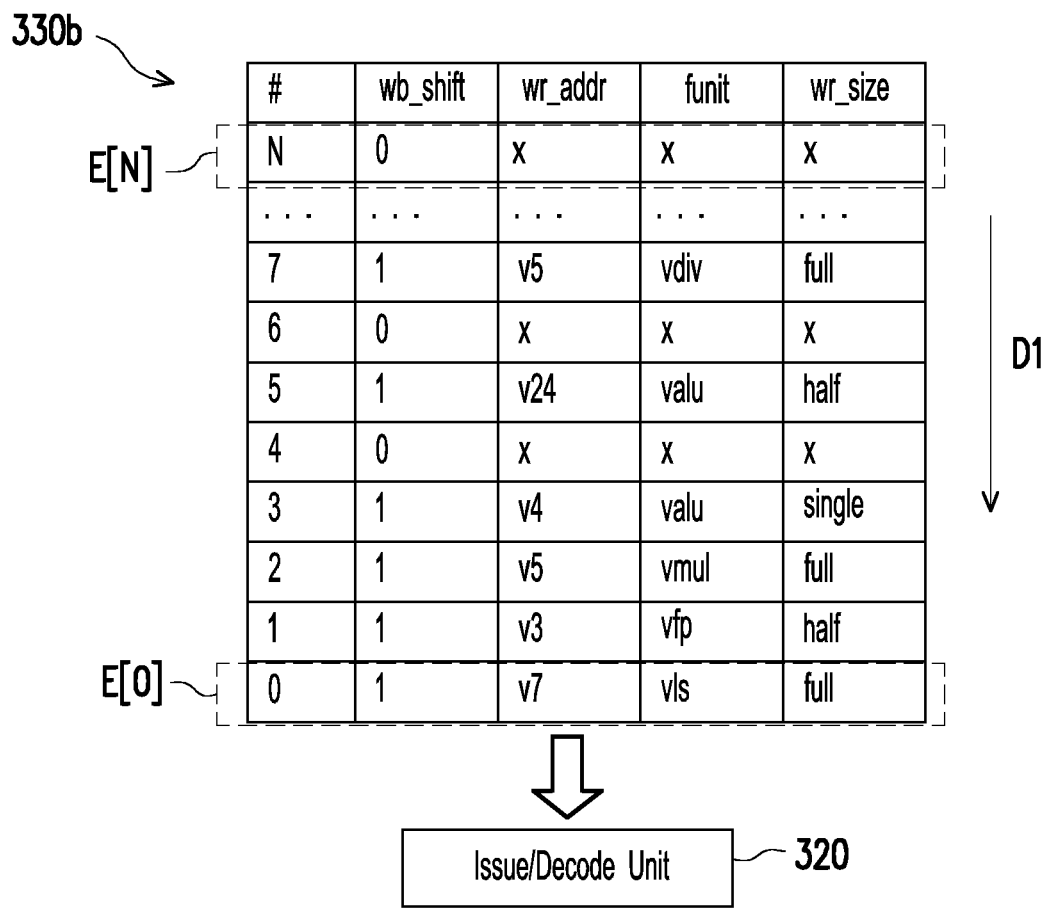

FIG. 3B is illustrates a latency shifter 330b in accordance with some embodiments. A difference between the latency shifter 330a shown in FIG. 3A and the latency shifter 330b shown in FIG. 3B is that the latency shifter 330b stores more information than that of the latency shifter 330a. More particularly, in addition to the writeback value, each entry of the latency shifter 330b may also include a register address value wr_addr, a functional unit value funit, and a writeback size value wr_size. It is noted that the other information or values related to the issuance and execution of the instructions may be included in the latency shifter 330b as well.

The register address value wr_addr[x] in each shifter entry of the latency shifter 330b may indicate the address of the register to which the data is written to in the $x^{th}$ clock cycle. For example, the register address value wr_addr[5] indicates that the result data is written to the register v5 in the fifth clock cycle. The functional unit value funit[x] may indicate the function unit that outputs the result data in the $x^{th}$ clock cycle. For example, the functional unit value funit[5] indicates that the result data is outputted by the ALU in the fifth clock cycle. The writeback size value wr_size[x] indicates the size of the result data in the $x^{th}$ clock cycle. For example, the writeback size value wr_size[5] indicates that the size of the result data is "half" in the fifth clock cycle.

The issue/decode unit 320 may control the issuance of an instruction based on at least one of the writeback value wb_shift, the register address value wr_addr, the functional unit value funit, and the writeback size value wr_size stored in the latency shifter 330b. In an example, if the writeback value wb_shift[x] is the first predetermined value, the issue/decode unit 320 may stall the instruction, and check the writeback value wb_shift[x+1] in the next clock cycle. If the writeback value wb_shift[x] is the second predetermined value, the issue/decode unit 320 may issue the instruction. The register address value wr_addr[x], the functional unit value funit[x], the size value wr_size[x] are written into the latency shifter along with setting the wb_shift[x] when the instruction is issued from issue/decode unit 320 to execution queue 150 via bus 123. As such, all necessary information for the issuance and execution of the instruction may be found in the latency shifter 330b. In other words, all execution pipeline control, such as functional unit, register address, and writeback data size, is in the latency shifter 330b, and no routing of control signals and register addresses from many different places are required. Furthermore, the function units of the functional unit module (e.g., functional unit module 160 in FIG. 2) do not need to keep track of the writeback register. In this way, the pipeline execution mechanism is simplified, centralized, and power consumption of the processor is reduced. In some embodiments, the number of entries for the latency shifter is set to the largest latency value of all instructions.

Figure 3C:
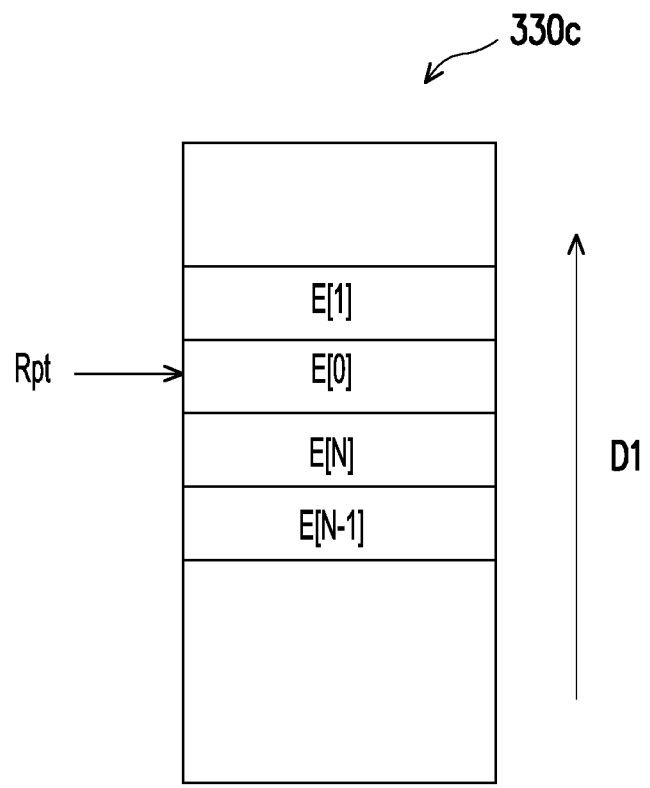
FIG. 3C illustrates a block diagram of a rotating buffer in accordance with some embodiments.

In some embodiments, the latency shifters 330a and 330b shown in FIG. 3A and FIG. 3B may be implemented by a rotating buffer for further saving the power consumption. FIG. 3C is a block diagram illustrating a rotating buffer 330c in accordance with some embodiments. The rotating buffer 300c may include a plurality of buffer entries E[0] through E[N] that are configured to store values of the latency shifter. In some embodiments, the rotating buffer 300c includes a read pointer Rpt, in which the read point Rpt may indicate the address of the buffer entry from which the stored values are read out. In some embodiments, one buffer entry of the rotating buffer 330c is shifted out every clock cycle, and the read pointer Rpt may move every clock cycle to indicate the address of the buffer entry that is shifted out.

A shift operation on the latency shifter is power hungry, because all shifter entries must be updated with the new values every clock cycle. When the rotating buffer 330 is used as the latency shifter (e.g., latency shifters 330a and 330b in FIG. 3A and FIG. 3B), the read point Rpt may prevent the necessity to update all the shifter entries of the latency shifter in every clock cycle. As a result, the power consumption for the latency shifter implemented by the rotating buffer is reduced.

Figure 4:
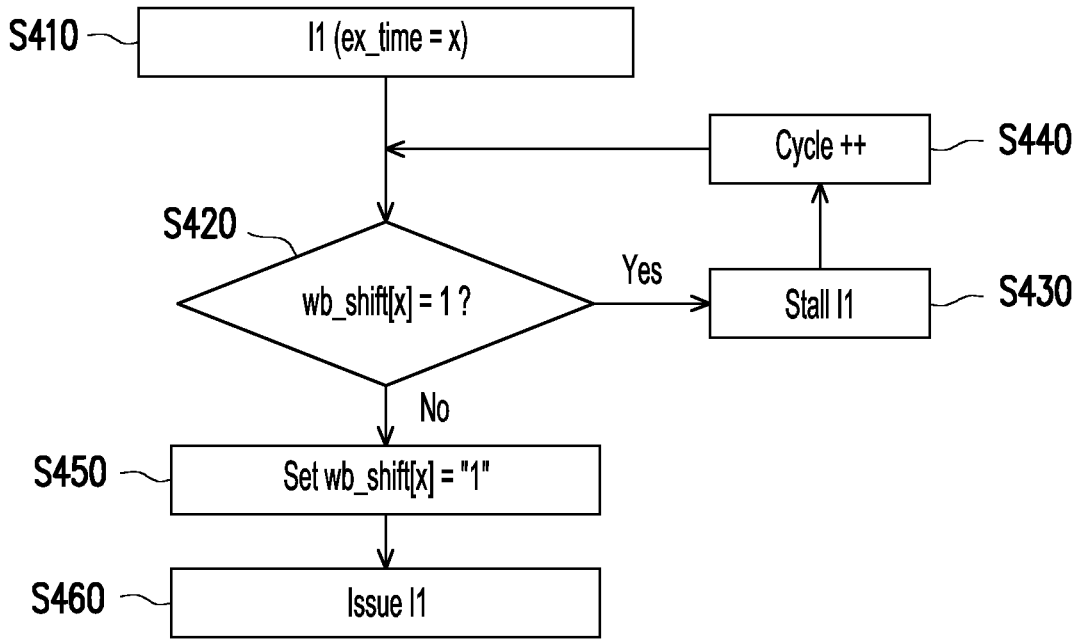
FIG. 4 is a flowchart diagram illustrating an issuance of an instruction based on a latency shifter in accordance with some embodiments.

FIG. 4 is a flowchart diagram illustrating an issuance of an instruction I1 based on latency shifter (e.g., latency shifter 130 in FIG. 2) in accordance with some embodiments. In step S410, the instruction I1 that has an execution latency time of x clock cycles is provided to the issue/decode unit (e.g., issue/decode unit 120 in FIG. 2). In step S420, the issue/decode unit may determine whether the writeback value wb_shift[x] that is stored in the latency shifter is the first predetermined value (e.g., "1") or the second predetermined value (e.g., "0"). When it determines that the writeback value wb_shift[x] is the first predetermined value, the issue/decode unit stalls the issuance of the instruction I1 in the $x^{th}$ clock cycle, and checks the writeback value wb_shift[x] in the next clock cycle to determine whether to issue or stall the instruction I1 (steps S430 and S440).

If the writeback value wb_shift[x] is the second predetermined value (e.g., "0"), the writeback value wb_shift[x] is set to the first predetermined value (e.g., "1") in step S450, and the issue/decode unit issues the instruction I1 in step S460. In other words, when the writeback value wb_shift[x] is the second predetermined value (e.g., "0"), it indicates that the write port of the register file is available for the writeback operation of the instruction I1 in the $x^{th}$ clock cycle. As such, the issuance of the instruction I1 is allowed, and the writeback value wb_shift[x] is set to the first predetermined value to prevent conflict with the other writeback operations to the write port in the $x^{th}$ clock cycle.

Figure 5:
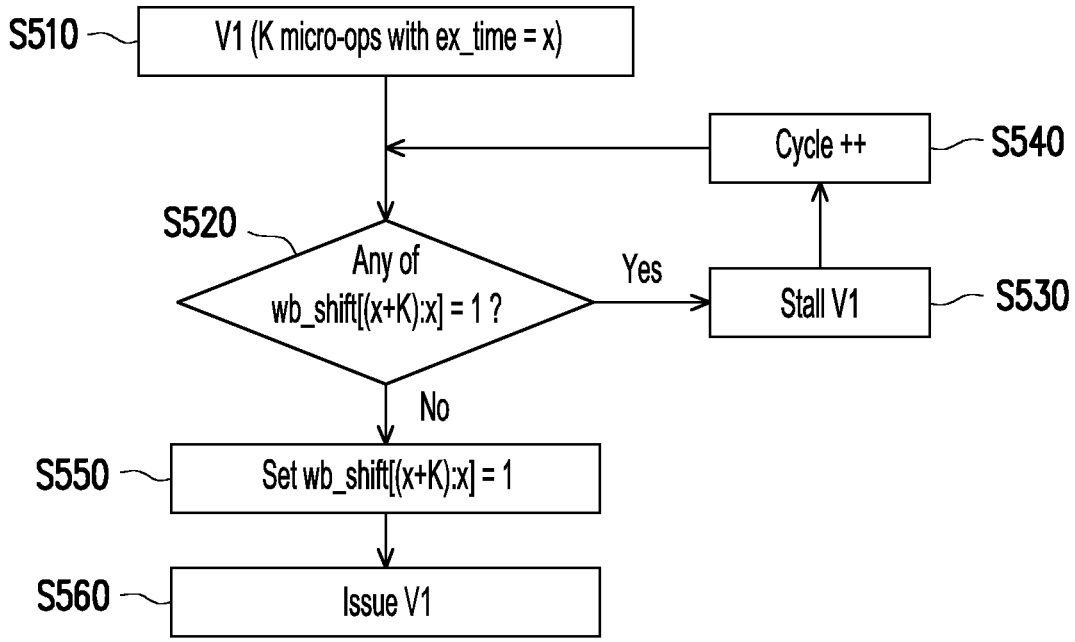
FIG. 5 is a flowchart diagram illustrating an issuance of a vector instruction based on a latency shifter in accordance with some embodiments.

FIG. 5 is a flowchart diagram illustrating an issuance of a vector instruction V1 based on a latency shifter (e.g., latency shifter 130 in FIG. 2) in accordance with some embodiments. The vector instruction V1 may include K micro-operations, in which each of the K micro-operations has the execution latency time of x clock cycles. The vector instruction V1 is provided to the issue/decode unit (e.g., issue/decode unit 120 in FIG. 2) in step S510. In step S520, the issue/decode unit may determine the writeback values wb_shift [(x+K):x] in multiple consecutive shifter entries of the latency shifter. When it determines that the at least one of the writeback values wb_shift [(x+K):x] is the first predetermined value (e.g., "1"), the issue/decode unit stalls the issuance of the vector instruction V1 in step S530. In step S540, the issue/decode unit stalls the vector instruction V1 until next clock cycle, and checks the writeback values wb_shift [(x+K): (x)] in the next clock cycle to determine whether to issue the vector instruction V1. In some embodiment, the read values for K micro-operations are not consecutive cycle but with a stride value s. In this case, the writeback values are wb_shift[K*s+1, (K−1)*s+1, (K−2)*s+1, . . . , 2s+1, s+1, 1]. The instruction is sent from execution queue 150 to functional unit 160 via bus 151 of FIG. 2, every s cycles.

If all writeback values wb_shift [(x+K):x] are the second predetermined value (e.g., "0"), all writeback values wb_shift [(x+K):x] are set to the first predetermined value (e.g., "1") in step S550, and the issue/decode unit issues the vector instruction V1 in step S560. In other words, when all writeback values wb_shift [(x+K):x] are the second predetermined value (e.g., "0"), it indicates that the write port of the register file is available for the writeback operation of the vector instruction V1 from the $x^{th}$ clock cycle to $(x+K)^{th}$ clock cycle. As such, the issuance of the vector instruction V1 is allowed, and the writeback values writeback values wb_shift [(x+K):x] are set to the first predetermined value to prevent the other writeback operation to the write port in from the $(x+K)^{th}$ clock cycle to $x^{th}$ clock cycle. Note that when K=0, then this FIG. 5 is the same as FIG. 4.

Figure 6:
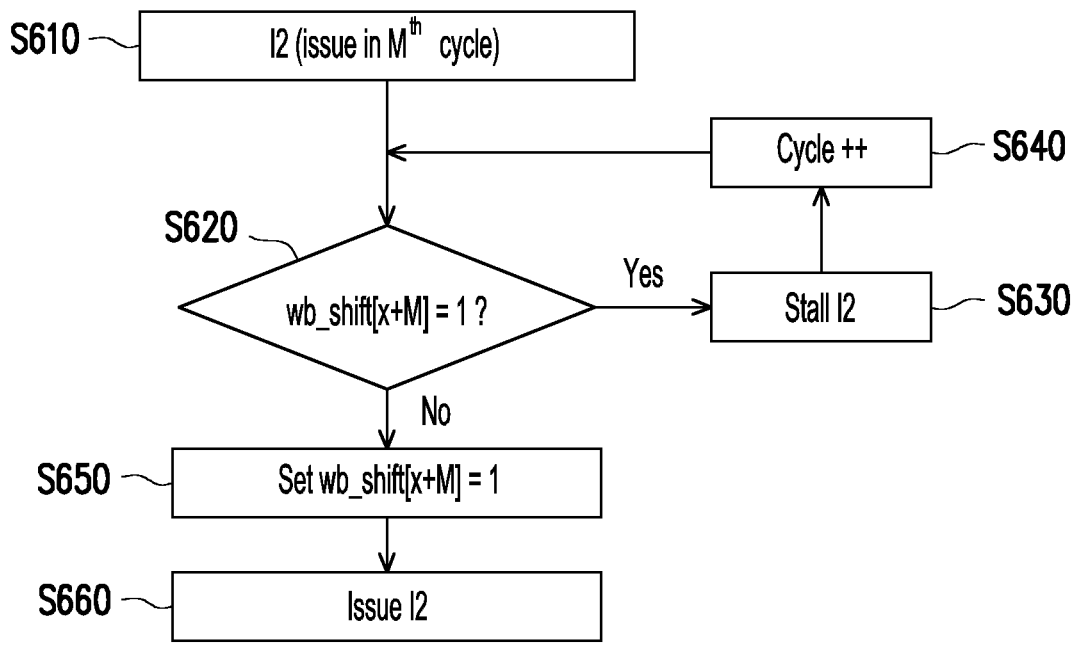
FIG. 6 is a flowchart diagram illustrating an issuance of an instruction in $M^{th}$ clock cycle in accordance with some embodiments.

FIG. 6 illustrates an issuance of an instruction I2 in $M^{th}$ clock cycle based on a latency shifter (e.g., latency shifter 130 in FIG. 2) in accordance with some embodiments. In step S610, the instruction I2 is provided to the issue/decode unit (e.g., issue/decode unit 120 in FIG. 2). In step S620, the issue/decode unit may determine whether the writeback value wb_shift[x+M] in the latency shifter is the first predetermined value (e.g., "1") or the second predetermined value (e.g., "0"). If the writeback value wb_shift[x+M] is the first predetermined value, the issue/decode unit stalls the issuance of the instruction I2 for one clock cycle, and checks the writeback value wb_shift[x+M] again in next clock cycle (steps S630 and S640). If the writeback value wb_shift[x+M] in the latency shifter is the second predetermined value (e.g., "0"), the writeback value wb_shift[x+M] is set to the first predetermined value (e.g., "1") in step S650, and the issue/decode unit issues the instruction I2 in step S660. Note that when M=0, then this FIG. 6 is the same as FIG. 4.

Figure 7:
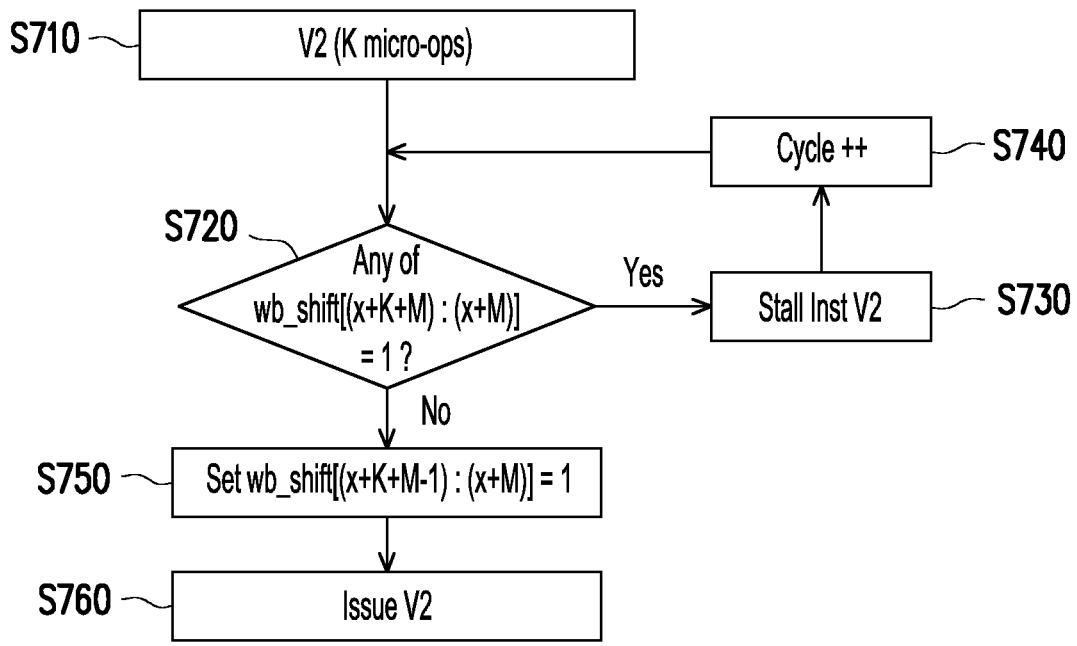
FIG. 7 is a flowchart diagram illustrating an issuance of a vector instruction in $M^{th}$ clock cycle in accordance with some embodiments.

FIG. 7 illustrates an issuance of a vector instruction V2 in $M^{th}$ clock cycle based on a latency shifter (e.g., latency shifter 130 in FIG. 2) in accordance with some embodiments. The vector instruction V2 may include K micro-operations, in which each of the K micro-operations has the execution latency time of x clock cycles. The vector instruction V2 is provided to the issue/decode unit (e.g., issue/decode unit 120 in FIG. 2) in step S710. In step S720, the issue/decode unit may determine whether any of the writeback values wb_shift [(x+K+M): (x+M)] in multiple consecutive shifter entries of the latency shifter is the first predetermined value or the second predetermined value. When it determines that at least one of the writeback values wb_shift [(x+K+M): (x+M)] is the first predetermined value (e.g., "1"), the issue/decode unit stalls the issuance of the vector instruction V2 for one clock cycle, and checks the writeback values wb_shift [(x+K+M): (x+M)] to determine whether to issue the vector instruction V2 (steps S730 and S740). When all writeback values wb_shift [(x+K+M): (x+M)] are the second predetermined value (e.g., "0"), all writeback values wb_shift [(x+K+M): (x+M)] are set to the first predetermined value (e.g., "1") in step S750, and the issue/decode unit issues the vector instruction V2 in step S760. Note that when M=0, then this FIG. 7 is the same as FIG. 5.

Figure 8:
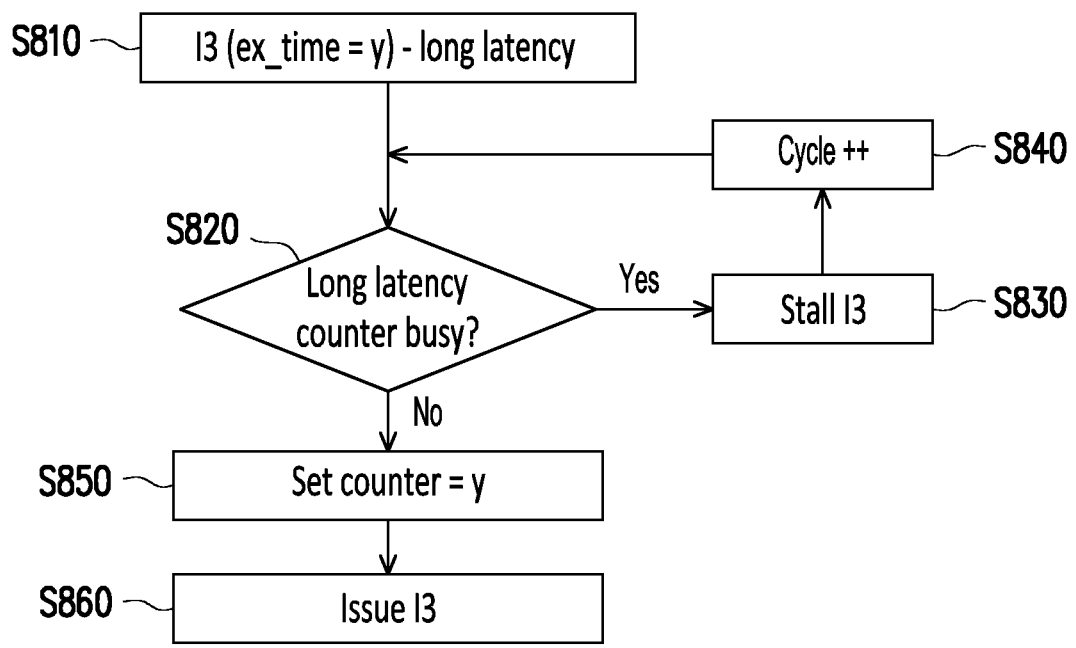
FIG. 8 is a diagram illustrating an issuance of a long-latency instruction based on a latency shifter and a long-latency counter in accordance with some embodiments.

In some embodiments, the number of entries in the latency shifter is limited to smaller size. For example, since most instructions have latency less than 32 cycles and less than a handful of instructions have latency more than 32 cycles, the latency shifter is set with 32 entries, and a mechanism is needed to handle the long latency instruction. The long latency counters are used for long latency instructions which is much more efficient in term of area, power, and timing. FIG. 8 illustrates an issuance of a long-latency instruction I3 based on a latency shifter (e.g., latency shifter 130 in FIG. 2) and a long-latency counter (e.g., counter 170 in FIG. 2) in accordance with some embodiments. The long-latency instruction I3 may be the floating-point instruction, the square-root instruction, the floating-point sum reduction instruction or the integer divide instruction.

In step S810, the long-latency instruction I3 that has y clock cycles execution time is provided to the issue/decode unit (e.g., issue/decode unit 120 in FIG. 2). The value of y is greater N which is the total number of the shifter entries of the latency shifter (e.g., latency shifter 130 in FIG. 2). For simplicity, each counter 170 can handle only one long latency instruction. The counter 170 may have a busy status and an available status, in which the busy status indicates that the counter 170 is busy in handling one long-latency instruction, and the available status indicates that the counter 170 is available for handling new long-latency instruction. In step S820, the status of the counter 170 is checked. When the counter 170 is in the busy status, the issue/decode unit stalls the issuance of the instruction I3 and re-check the status of the counter 170 in next clock cycle (steps S830 and S840). When the counter 170 is in the available status, the a counter value ex_cnt[y] is set for the long-latency counter (e.g., counter 170 in FIG. 2) based on the execution latency time y of the long-latency instruction I3 (step S850). The issue/decode unit issues the instruction I3 in step S860. In some embodiments, the counter is configured to count down the counter value ex_cnt[y] every clock cycle until the counter value ex_cnt[y] reaches N; meaning that the result data from the long latency instruction will write back to the register file 140 in N clock cycles. When the counter value ex_cnt[y] of the long-latency counter reaches N, the writeback value wb_shift[N] of the top latency shifter is set to the first predetermined value (e.g., "1"). As aforementioned, the long-latency instruction I3 has higher priority to write into the latency shifter, thus the long-latency instruction I3 can always write to the latency shifter without any conflict.

Figure 9:
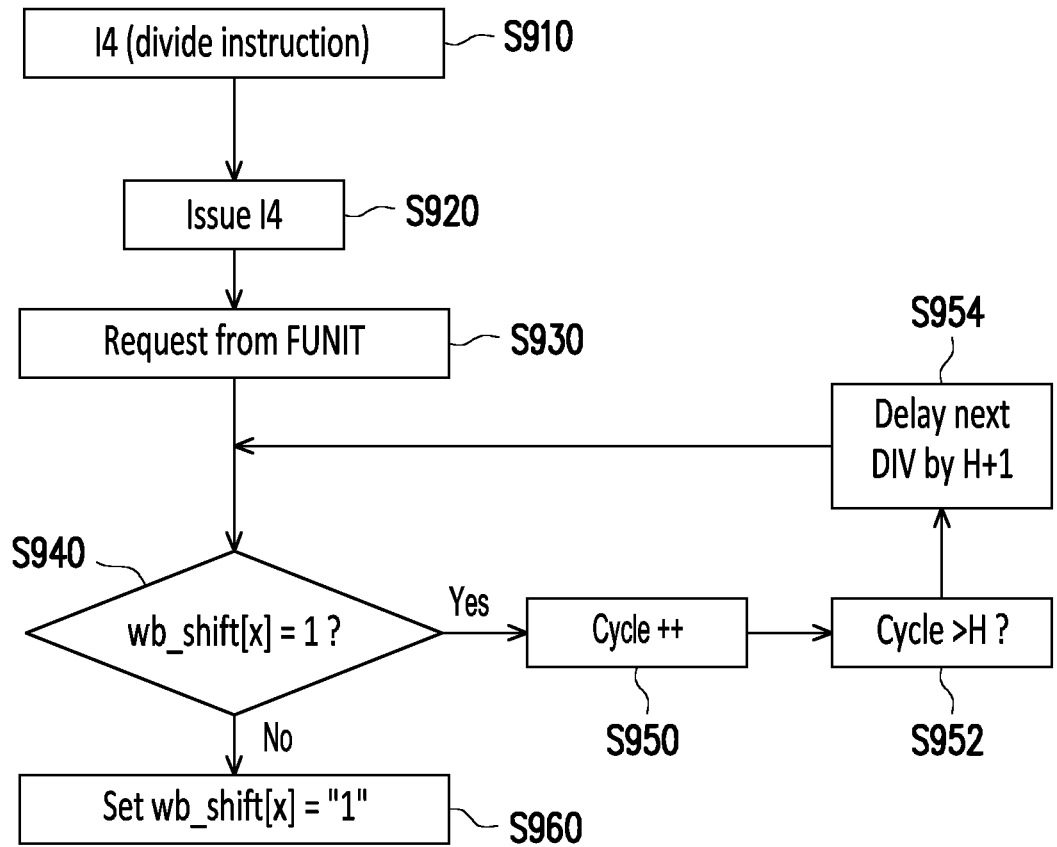
FIG. 9 is a flowchart diagram illustrating an issuance of a divide instruction based on a latency shifter in accordance with some embodiments.

FIG. 9 illustrates an issuance of a divide instruction I4 based on a latency shifter (e.g., latency shifter 130 in FIG. 2) in accordance with some embodiments. The divide instruction having dynamic execution time which is known during the execution of the divide operation. In other words, it takes few clock cycles (e.g., 6 clock cycles) to know the execution time of the divide instruction. In some embodiments, the latency shifter is not set during the instruction issuing stage, but is set after few clock cycles of execution when the execution time is known.

The divide instruction I4 is provided to the issue/decode unit in step S910 (e.g., issue/decode unit 120 in FIG. 2), and the divide instruction I4 is issued to the execution queue 150 without setting any write back value in the latency shifter (step S920). The instruction I4 is eventually issue to functional unit 160 for execution. The functional unit analyzed the source operand data to determine the true latency, e.g. x, of the instruction I4 at which time the functional unit 160 in step S930 accesses the latency shifter 130 to check for the value of wb_shift[x] for conflict before setting the wb_shift [x] to the first predetermined value.

At sometimes in the future, when the latency time of the divide instruction I4 is known from the functional unit module, the functional unit module sends the latency time (e.g., x clock cycles) to the latency shifter. In step S940, the issue/decode unit 120 may determine whether the writeback value wb_shift[x] of the shifter entry associated with the $x^{th}$ clock cycle is the first predetermined value (e.g., "1") or the second predetermined value (e.g., "0"). When the writeback value wb_shift[x] is the first predetermined value (e.g., "1"), the issue/decode unit 120 may check the writeback value of the shifter entry in next clock cycle (step S950). In step S950, a cycle count is used to keep track of how many cycles after the valid result data produced by the functional unit 160 will be written to the register file 140. The result data of instruction I4 can only be written to the register file 140 only if the write port is available. The divide functional unit can hold the result data for a number of clock cycles before the result data is overwritten by the next divide instruction; e.g. H cycles. In step S952, the cycle count is compared to H, if the cycle count is greater than H, then the next divide instruction must be stalled for excessed cycles in the execution queue 150 before issuing to the functional unit 160 in step S954. When the writeback value wb_shift[x] is the second predetermined value (e.g., "0"), the writeback value wb_shift[x] is set to the first predetermined value (e.g., "1") in step S960. As such, the writeback operation is performed to write the result data of the divide instruction I4 from the functional unit module to the register file based on the writeback values of the latency shifter.

Figure 10:
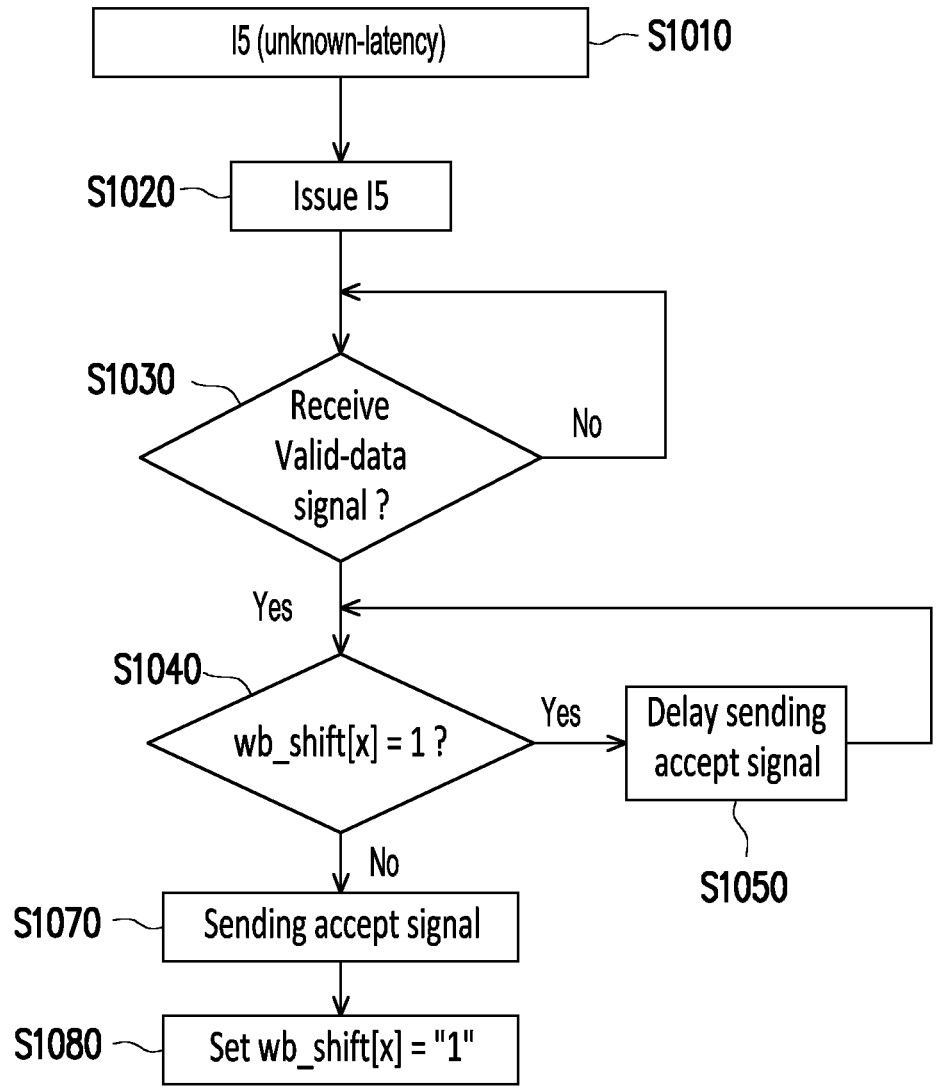
FIG. 10 is a flowchart diagram illustrating an issuance of a load instruction based on a latency shifter in accordance with some embodiments.

FIG. 10 illustrates an issuance of a load instruction I5 based on a latency shifter (e.g., latency shifter 130 in FIG. 2) in accordance with some embodiments. The load instruction has unknown latency execution time because the nature of data cache hit/miss and data bank conflict. The request-accept protocol may be implemented for the issuance of the load instruction. The data cache hit for load instruction is similar to the divide instruction where the load execution unit accesses the latency shifter 130 to set the wb_shift[x] to claim the write port for writing back data from the data cache.

The load instruction I5 is provided and issued without setting any writeback value in the latency shifter in steps S1010 and S1020. In some embodiments, the load/store functional unit of the functional unit module is implemented with accept/acknowledge protocol where the data cache sends signal indicated valid data when the data is found and the load/store functional unit can accept data by replying with an accept/acknowledge signal. In some embodiments, when the data cache is missed, the data must be looked for in the lower-level component such as the L2 data cache, the L3 data cache or the external memory. Once data is found in the lower-level component, the data cache may send the valid-data signal to the load/store function unit. The data cache will hold the data until the accept/acknowledge signal is received from the load/store functional unit.

In step S1030, the load/store function unit checks whether the valid data signal (e.g., signal indicating the valid data of the data cache) is received. When the valid data signal is received, the functional unit module may determine whether the writeback value wb_shift(x) corresponding to $x^{th}$ clock cycle is the first predetermined value (e.g., "1"). When the writeback value wb_shift(x) is the first pre-determined value, the load/store functional unit may delay sending the accept/acknowledge signal to the data cache which will keep the data (steps S1050). When the writeback value wb_shift (x) is the second pre-determined value (e.g., "0"), the load/store functional unit sends the accept/acknowledge signal to the data cache in step S1070, and the writeback value wb_shift(x) is set to the first pre-determined value (e.g., "1") in step S1080. In this way, the control of the issuance and writeback operation of the load instruction I5 is simplified with the use of the latency shifter (e.g., latency shifter 130 in FIG. 2).

In some embodiments, the register file (e.g., the register file 140 in FIG. 2) includes a plurality of shared write ports and a dedicated write port, in which the shared write ports are shared for all functional units or between a group of functional units, and the dedicated write port is configured for the unknown execution latency time. Since the unknown instruction such as the load instruction is written in the register file using the dedicated write port, the pipeline control mechanism is simplified while preventing the conflict in the pipeline.

Figure 11:
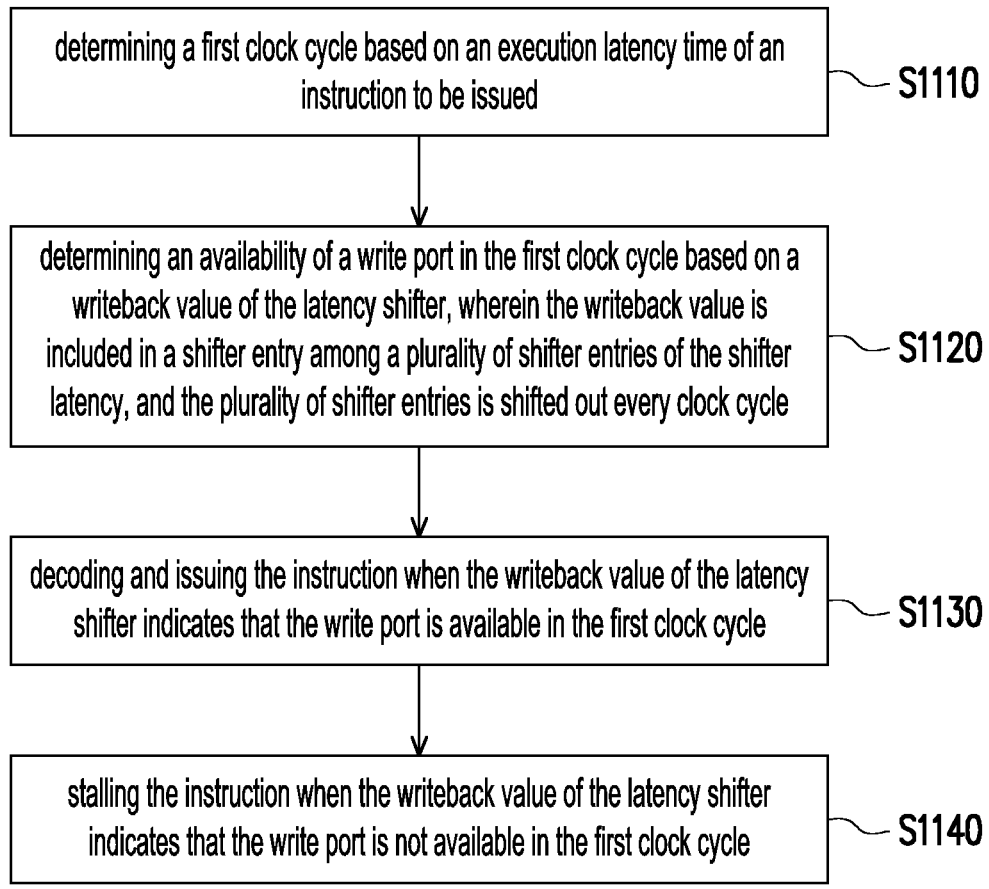
FIG. 11 is a flowchart diagram illustrated a method of controlling an instruction pipeline in accordance with some embodiments.

FIG. 11 illustrates a method of controlling a pipeline execution in accordance with some embodiments. In step S1110, a first clock cycle of an instruction to be issued is determined based on an execution latency time of the instruction. In step S1120, an availability of a write port in the first clock cycle is determined based on a writeback value of a latency shifter, wherein the writeback value is included in a shifter entry among a plurality of shifter entries of the shifter latency, and the plurality of shifter entries is shifted out every clock cycle. In step S1130, the instruction is decoded and issued when the writeback value of the latency shifter indicates that the write port is available in the first clock cycle. In step S1140, the instruction is stalled when the writeback value of the latency shifter indicates that the write port is not available in the first clock cycle.

In accordance with some embodiments of the disclosure, a processor that includes a register file, a latency shifter, a decode unit and a plurality of functional units is introduced. The register file includes a write port. The latency shifter includes a plurality of shifter entries and is configured to shift out a shifter entry among the plurality of shifter entries every clock cycle. Each of the plurality of shifter entries is associated with a clock cycle and each of the plurality of shifter entries include a writeback value that indicates whether the write port of the register file is available for a writeback operation in the associated clock cycles. The decode unit is coupled to the latency shifter and is configured to decode an instruction and issue the instruction according to the writeback value of the latency shifter. The plurality of functional units is coupled to the decode unit and the register file and is configured to execute the instruction issued by the decode unit and perform the writeback operation to the write port of the register file.

In accordance with some embodiments of the disclosures, a method of controlling an instruction pipeline is introduced. The method includes steps of determining a first clock cycle of an instruction to be issued based on an execution latency time of the instruction; determining an availability of a write port in the first clock cycle based on a writeback value of a latency shifter, wherein the writeback value is included in a shifter entry among a plurality of shifter entries of the shifter latency, and the plurality of shifter entries is shifted out every clock cycle; decoding and issuing the instruction when the writeback value of the latency shifter indicates that the write port is available in the first clock cycle; and stalling the instruction when the writeback value of the latency shifter indicates that the write port is not available in the first clock cycle.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microprocessor, comprising:
a register file, comprising a write port;
a latency shifter, comprising a plurality of shifter entries, configured to shift out a shifter entry among the plurality of shifter entries every clock cycle, wherein each of the plurality of shifter entries is associated with a clock cycle and each of the plurality of shifter entries comprises a writeback value that indicates an availability of the write port of the register file for a writeback operation in the clock cycle;
a decode unit, coupled to the latency shifter, configured to decode an instruction and issue the instruction based on the writeback values included in the plurality of shifter entries of the latency shifter; and
at least one functional unit, coupled to the decode unit and the register file, configured to execute the instruction issued by the decode unit and to produce a result data at the writeback value to the write port of the register file,
wherein the register file further comprises a plurality of registers having a plurality of register addresses, and each of the plurality of shifter entries of the latency shifter further comprises:
a register address value, configured to store a register address among the plurality of register addresses for the writeback operation of the instruction; and
a functional unit value, configured to indicate a functional unit among the at least one functional unit for executing the instruction.

2. The microprocessor of claim 1, wherein the latency shifter is configured to shift out a bottom shifter entry of the latency shifter every clock cycle, wherein the shifted out values of the shifter control the writeback operation of the register file.

3. The microprocessor of claim 1, wherein
when the writeback value is a first pre-determined value, the write port of the register file is not available for the writeback operation in the clock cycle; and
when the writeback value is a second pre-determined value, the write port of the register file is available for the writeback operation in the clock cycle.

4. The microprocessor of claim 3, wherein
when a first instruction to be issued is configured to perform a first writeback operation in a first clock cycle and the latency shifter indicates that the write port of the register file is not available in the first clock cycle, the decode unit is configured to stall an issuance of the first instruction, and
when the first instruction to be issued is configured to perform the first writeback operation in the first clock cycle and the latency shifter indicates that the write port of the register file is available in the first clock cycle, the decode unit is configured to issue the first instruction and set the writeback value of the shifter entry associated with the first clock cycle to the first pre-determined value.

5. The microprocessor of claim 4, wherein the first clock cycle of the first instruction is determined according to an execution latency time of the first instruction.

6. The microprocessor of claim 4, wherein
when the decode unit is configured to stall the issuance of the first instruction in the first clock cycle, the decode unit is configured to determine the availability of the write port of the register file in a second clock cycle that is next to the first clock cycle.

7. The microprocessor of claim 1, further comprising:
an instruction unit, coupled to the decode unit, configured to provide the instruction to the decode unit; and
an execution queue, coupled to the issue/decode unit and the at least one functional unit, configured to store issued instructions to a plurality of queue entries of the execution queue and provide the issued instructions stored in the execution queue to the at least one functional unit.

8. The microprocessor of claim 1, wherein
the latency shifter is implemented using a rotating buffer, and the rotating buffer comprises:
a read pointer, configured to indicate a buffer address from which an element is read out from the rotating buffer.

9. The microprocessor of claim 1, further comprising:
a long latency counter, coupled to the latency shifter, configured to count down a settable counter value every clock cycle until the settable counter value reaches a first threshold value, wherein
the issue/decode unit is further configured to decode and issue the instruction based on a status of the long-latency counter,
when the status of the long-latency counter is a busy status and an execution latency time of the instruction is greater than a second threshold value, the issue/decode unit is configured to stall an issuance of the instruction, and
when the status of the long-latency counter is an available status and the execution latency time of the instruction is greater than the second threshold value, the settable counter value is set according to the execution latency time of the instruction.

10. The microprocessor of claim 9, wherein
when the settable counter is counted down to the first threshold value by the counter a top shifter entry of the latency shifter is set for the instruction.

11. The microprocessor of claim 1, wherein the at least one functional unit comprises a load/store functional unit that is configured to:
delay sending an accept signal to a data cache in response to determining that a valid-data signal is received from the data cache and the writeback value in the clock cycle indicates that the write port of the register file is not available in the clock cycle; and
send the accept signal to the data cache in response to determining that the valid-data signal is received from the data cache and the writeback value in the clock cycle indicates that the write port of the register file is available in the clock cycle.

12. The microprocessor of claim 1, wherein the write port comprises:
a plurality of first write ports that is shared for the at least one functional unit; and
a second write port that is dedicated for an unknown-latency instruction.

13. The microprocessor of claim 12, wherein
the latency shifter comprises a plurality of first latency shifters, and each of the plurality of first latency shifters corresponds to one of the plurality of first write ports.

14. The microprocessor of claim 13, wherein
the instruction is a vector instruction that comprises a plurality of micro operations, and
the plurality of micro operations of the vector instruction are included in a same first latency shifter among the plurality of first latency shifters.

15. The microprocessor of claim 1, wherein
the instruction is a vector instruction that comprises a plurality of micro operations, and
the micro operations are included in consecutive shifter entries of the latency shifter.

16. A method of scheduling a write port of a register file of a microprocessor, comprising:
determining a first clock cycle based on an execution latency time of an instruction to be issued;
determining an availability of the write port in the first clock cycle based on a writeback value of a latency shifter, wherein the writeback value is included in a shifter entry among a plurality of shifter entries of the shifter latency, and the plurality of shifter entries is shifted out every clock cycle;
decoding and issuing the instruction when the writeback value of the latency shifter indicates that the write port is available in the first clock cycle; and
stalling the instruction when the writeback value of the latency shifter indicates that the write port is not available in the first clock cycle,
wherein the register file further comprises a plurality of registers having a plurality of register addresses, and each of the plurality of shifter entries of the latency shifter further comprises:
a register address value, storing a register address among the plurality of register addresses for the writeback operation of the instruction; and
a functional unit value, indicating a functional unit among at least one functional unit of the microprocessor for executing the instruction.

17. The method of claim 16, wherein
when the writeback value is a first pre-determined value, the write port of the register file is not available for the writeback operation in the clock cycle; and
when the writeback value is a second pre-determined value, the write port of the register file is available for the writeback operation in the clock cycle.

18. The method of claim 17, further comprising:
setting the writeback value to the first pre-determined value when the instruction is decoded and issued;
determining whether the write port of the register file is available in a second clock cycle that is next to the first clock cycle; and
decoding and issuing the instruction when the writeback value of the latency shifter indicates that the write port is available in the second clock cycle.

19. The method of claim 16, further comprising:
determining a status of a long-latency counter;
determining whether an execution latency time of the instruction is greater than a second threshold value;
stalling an issuance of the instruction when the status of the long-latency counter is a busy status and the execution latency time of the instruction is greater than the second threshold value; and
setting a settable counter value of the long-latency counter based on the execution latency time of the instruction when the status of the long-latency counter is an available status and the execution latency time of the instruction is greater than the second threshold value.

20. The method of claim 19, further comprising:
counting down the settable counter value every clock cycle until the settable counter value reaches a first threshold value;
issuing the instruction and setting a top shifter entry of the latency shifter for the instruction in response to determining that the settable counter is counted down to the first threshold value.

21. A data processing system, comprising:
a microprocessor, wherein said microprocessor includes:
a register file, comprising a write port;
a latency shifter, comprising a plurality of shifter entries, configured to shift out a shifter entry among the plurality of shifter entries every clock cycle, wherein each of the plurality of shifter entries is associated with a clock cycle and each of the plurality of shifter entries comprises a writeback value that indicates an availability of the write port of the register file for a writeback operation in the clock cycle;
an instruction unit, configured to provide an instruction;
a decode unit, coupled to the latency shifter, configured to decode the instruction and issue the instruction based on the writeback values included in the plurality of shifter entries of the latency shifter;
an execution queue, coupled to the decode unit, configured to store issued instructions to a plurality of queue entries of the execution queue; and
at least one functional unit, coupled to the execution queue and the register file, configured to execute the issued instructions and to produce a result data at the writeback value to the write port of the register file;
a main memory, coupled to the microprocessor;
a bus bridge, coupled to the microprocessor; and
an input/output device, coupled to the bus bridge,
wherein the register file further comprises a plurality of registers having a plurality of register addresses, and each of the plurality of shifter entries of the latency shifter further comprises:
a register address value, configured to store a register address among the plurality of register addresses for the writeback operation of the instruction; and
a functional unit value, configured to indicate a functional unit among the at least one functional unit for executing the instruction.

22. The data processing system of claim 21, wherein the latency shifter is configured to shift out a bottom shifter entry of the latency shifter every clock cycle, wherein the shifted out values of the shifter control the writeback operation of the register file.

23. The data processing system of claim 21, wherein
when the writeback value is a first pre-determined value, the write port of the register file is not available for the writeback operation in the clock cycle; and
when the writeback value is a second pre-determined value, the write port of the register file is available for the writeback operation in the clock cycle.

24. The data processing system of claim 21, wherein
when a first instruction to be issued is configured to perform a first writeback operation in a first clock cycle and the latency shifter indicates that the write port of the register file is not available in the first clock cycle, the decode unit is configured to stall an issuance of the first instruction, and
when the first instruction to be issued is configured to perform the first writeback operation in the first clock cycle and the latency shifter indicates that the write port of the register file is available in the first clock cycle, the decode unit is configured to issue the first instruction and set the writeback value of the shifter entry associated with the first clock cycle to the first predetermined value.

25. The data processing system of claim 24, wherein the first clock cycle of the first instruction is determined according to an execution latency time of the first instruction.

26. The data processing system of claim 21, further comprising:
- a long latency counter, coupled to the latency shifter, configured to count down a settable counter value every clock cycle until the settable counter value reaches a first threshold value, wherein
- the issue/decode unit is further configured to decode and issue the instruction based on a status of the long-latency counter,
- when the status of the long-latency counter is a busy status and an execution latency time of the instruction is greater than a second threshold value, the issue/decode unit is configured to stall an issuance of the instruction, and
- when the status of the long-latency counter is an available status and the execution latency time of the instruction is greater than the second threshold value, the settable counter value is set according to the execution latency time of the instruction.

27. The data processing system of claim 25, wherein when the settable counter is counted down to the first threshold value by the counter a top shifter entry of the latency shifter is set for the instruction.

\* \* \* \* \*